United States Patent
Kim

(10) Patent No.: US 10,417,082 B2
(45) Date of Patent: Sep. 17, 2019

(54) MEMORY SYSTEMS AND OPERATING METHOD THEREOF

(71) Applicant: SK hynix Inc., Gyeonggi-do (KR)

(72) Inventor: Tae-Hoon Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/826,857

(22) Filed: Nov. 30, 2017

(65) Prior Publication Data
US 2018/0253345 A1    Sep. 6, 2018

(30) Foreign Application Priority Data
Mar. 3, 2017  (KR) .................. 10-2017-0027615

(51) Int. Cl.
*G06F 11/07* (2006.01)
*G06F 11/10* (2006.01)

(52) U.S. Cl.
CPC .......... *G06F 11/079* (2013.01); *G06F 11/073* (2013.01); *G06F 11/0751* (2013.01); *G06F 11/1048* (2013.01)

(58) Field of Classification Search
CPC .. G06F 11/079; G06F 11/073; G06F 11/0751; G06F 11/1048
USPC .................................................. 365/185.09
See application file for complete search history.

(56) References Cited

U.S. PATENT DOCUMENTS

| | | | | |
|---|---|---|---|---|
| 8,259,497 | B2 * | 9/2012 | Shalvi | G11C 11/56 365/185.09 |
| 9,030,873 | B2 * | 5/2015 | Lee | G11C 16/0483 365/185.09 |
| 9,372,629 | B2 | 6/2016 | Bhalerao et al. | |
| 2002/0054508 | A1 * | 5/2002 | Nozoe | G06F 11/1068 365/185.09 |
| 2003/0117846 | A1 * | 6/2003 | Hasegawa | G06F 11/1068 365/185.09 |
| 2003/0156453 | A1 * | 8/2003 | Pochmuller | G06F 11/1044 365/185.09 |
| 2008/0123419 | A1 * | 5/2008 | Brandman | G06F 11/1072 365/185.09 |
| 2008/0123420 | A1 * | 5/2008 | Brandman | G06F 11/1072 365/185.09 |
| 2009/0196101 | A1 * | 8/2009 | Abe | G06F 11/1048 365/185.09 |
| 2009/0310408 | A1 * | 12/2009 | Lee | G11C 11/5628 365/185.03 |
| 2009/0316483 | A1 * | 12/2009 | Kim | G11C 11/5628 365/185.09 |
| 2010/0195393 | A1 * | 8/2010 | Eggleston | G06F 11/106 365/185.09 |

(Continued)

FOREIGN PATENT DOCUMENTS

| KR | 1020140044107 | 4/2014 |
|---|---|---|
| KR | 1020150073717 | 7/2015 |
| KR | 101651573 | 8/2016 |

*Primary Examiner* — Harry W Byrne
(74) *Attorney, Agent, or Firm* — IP & T Group LLP

(57) ABSTRACT

A memory system comprising: a memory device including a plurality of memory dies each having a plurality of the memory blocks; and a controller suitable for performing a command operation to the memory dies, wherein the memory device comprises means for performing an error check operation to a first data provided from the controller to store the first data the memory device.

33 Claims, 11 Drawing Sheets

(56) References Cited

U.S. PATENT DOCUMENTS

| | | | |
|---|---|---|---|
| 2010/0202203 A1* | 8/2010 | Choi | G06F 11/1068 365/185.09 |
| 2014/0036589 A1* | 2/2014 | Parthasarathy | G06F 11/1048 365/185.09 |
| 2014/0169091 A1* | 6/2014 | Yao | G11C 29/04 365/185.09 |

* cited by examiner

MEMORY SYSTEMS AND OPERATING METHOD THEREOF

CROSS-REFERENCE TO RELATED APPLICATION

This application claims priority under 35 U.S.C. § 119 to Korean Patent Application No. 10-2017-0027615 filed on Mar. 3, 2017 in the Korean Intellectual Property Office, the disclosure of which is incorporated herein by reference in its entirety.

TECHNICAL FIELD

Exemplary embodiments relate to a memory system and, more particularly, to a memory system for processing data to and from a memory device, and an operating method thereof.

DISCUSSION OF THE RELATED ART

The computer environment, paradigm has changed to ubiquitous computing systems that can be used anytime and anywhere. Due to this fact use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption because they have no moving parts. Examples of memory systems having such advantages include universal serial bus (USB) memory devices, memory cards having various interfaces and solid state drives (SSD).

SUMMARY

Various embodiments of the present invention are directed to an improved memory system exhibiting improved reliability and performance compared to existing memory systems.

The memory system may further exhibit reduced performance deterioration.

The memory system may further increase the use efficiency of a memory device contained in the memory system.

The present invention is also directed to an operating method for the memory system.

In an embodiment, a memory system may include a memory device including a plurality of memory dies each having a plurality of the memory blocks; and a controller suitable for performing a command operation to the memory dies, the memory device may include means for performing an error check operation to a first data provided from the controller to store the first data the memory device.

The memory device may be suitable for requesting the controller to retransfer the first data without storage of the first data when an error is included in the first data.

When an error is not included in the first data, the memory device may store the first data in the memory blocks, and may transfer to the controller a signal indicating a success of a program operation to the first data.

After reading the first data stored in the memory blocks, the memory device may perform the error check operation for the read first data, and when the read first data include an error, the memory device may store again the first data which do not include an error, in the memory blocks.

The memory device may perform the error check operation to a second data read from the memory blocks, and may transfer to the controller the second data which do not include an error.

The memory device may read again the second data from the memory blocks when an error is included in the second data.

The controller may perform the error check operation to the second data provided from the memory device, may provide to an outside the second data which do not include an error, and may request to the memory device retransfer of the second data when the second data include an error.

The memory system may further include a monitor suitable for checking an abnormal state of one or more of the controller and the memory device, the monitor may transfer to the controller and the memory device a trigger signal, which triggers the error check operations, when one or more of the controller and the memory device are in the abnormal state.

The abnormal state may be determined when requirement parameters including operation docks, power levels, current/voltage levels, operation timings and temperature levels for the controller and the memory device exist in an abnormal range.

The memory device may include buffers corresponding to the memory dies, respectively, and the buffers respectively may include error check units which perform the error check operation for data to be stored in the memory dies.

The error check operation may include a mathematical operation or a logical operation using data bits and check bits of the first data.

The memory device may further include an interface module suitable for transferring the first data transferred from the controller, and the interface module may include error check units suitable for performing the error check operations to the first data, and transferring the first data to corresponding memory dies among the memory dies.

In an embodiment, a method for operating a memory system including a controller and a memory device including a plurality of memory dies each having a plurality of the memory blocks, the method may include: providing, from the controller to the memory device, a first data; and performing, by the memory device, an error check operation to the first data to store the first data therein.

The method may further include requesting, by the memory device to the controller, retransfer of the first data without storage of the first data when an error is included in the first data.

The method may further include when an error is not included in the first data: storing, by the memory device, the first data in the memory blocks; and transferring, by the memory device to the controller, a signal indicating a success of a program operation to the first data.

The method may further include: performing, by the memory device, the error check operation to a second data read from the memory blocks; and transferring, by the memory device to the controller, the second data which do not include an error.

The method may further include reading again, by the memory device, the second data from the memory blocks when an error is included in the second data.

The method may further include: performing, by the controller, the error check operation to the second data provided from the memory device; providing, by the controller to an outside, the second data which do not include an error; and requesting, by the controller to the memory device, retransfer of the second data when the second data include an error.

The method may further include: checking, by a monitor, an abnormal state of one or more of the controller and the memory device; and transferring, by the monitor to the controller and the memory device, a trigger signal, which triggers the error check operations, when one or more of the controller and the memory device are in the abnormal state.

The abnormal state may be determined when requirement parameters including operation clocks, power levels, current/voltage levels, operation timings and temperature levels for the controller and the memory device exist in an abnormal range.

The error check operation may include a mathematical operation or a logical operation using data bits and check bits of the first data.

In an embodiment, a memory system may include: a memory device including a plurality of memory dies each having a plurality of the memory blocks; and a controller suitable for performing a command operation to the memory dies, the memory device may perform an error check operation to a first data provided from the controller to store the first data the memory device.

The memory device may be suitable for requesting the controller to retransfer the first data without storage of the first data when an error is included in the first data.

When an error is not included in the first data, the memory device may store the first data in the memory blocks and may transfer to the controller a signal indicating a success of a program operation to the first data.

The memory device may perform the error check operation to a second data read from the memory blocks, and may transfer to the controller the second data which do not include an error.

The memory system may further include a monitor suitable for checking an abnormal state of one or more of the controller and the memory device, the monitor may transfer to the controller and the memory device a trigger signal, which triggers the error check operations, when one or more of the controller and the memory device are in the abnormal state.

The memory device may include buffers corresponding to the memory dies, respectively, and the buffers respectively may include error check units which perform the error check operation for data to be stored in the memory dies.

The error check operation may include a mathematical operation or a logical operation using data bits and check bits of the first data.

DETAILED DESCRIPTION

Figure 1:
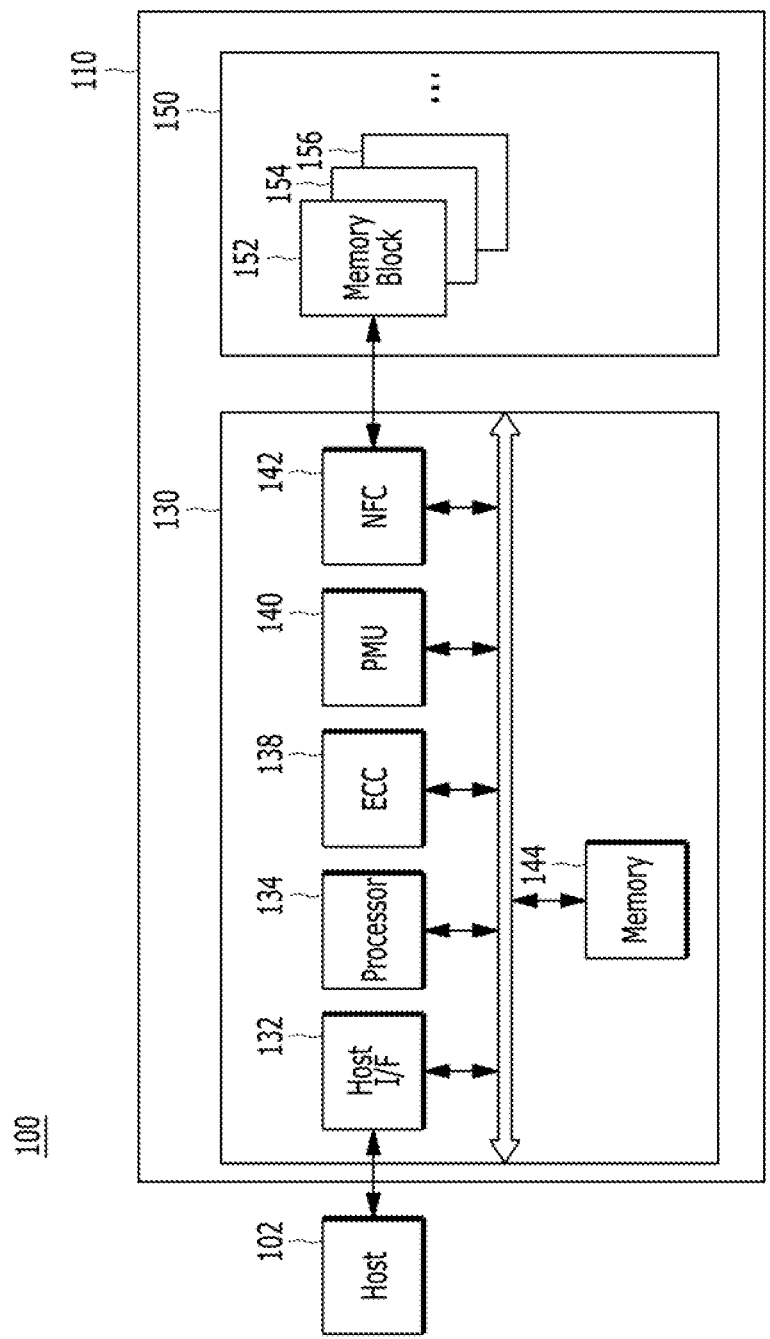
FIG. 1 is a block diagram illustrating a data processing system including a memory system, in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to dearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context dearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning n the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include a portable electronic device such as a mobile phone, MP3 player and laptop computer or a non-portable electronic device such as a desktop computer, game machine, TV and projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. In an embodiment the host 102 may include a plurality of OSs, and execute an OS to perform an operation corresponding to a user's request on the memory system 110.

The memory system 110 may store data for the host 102 in response to a request received from the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the SD card may include a mini-SD card and micro-SD card.

The memory system 110 may be embodied as any one of various types of storage devices including, for example, volatile memory devices such as a DRAM dynamic random access memory (DRAM) and a static RAM (SRAM) and nonvolatile memory devices such as a read only memory (ROM), a mask ROM (I ROM a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM) resistive RAM (RRAM) and a flash memory. The memory system may have a 3-dimensional (3D) stack structure. In an embodiment, the memory system 110 may be implemented as a three-dimensional flash memory.

The memory system 110 may include a memory device 150 and a controller 130 operatively coupled to each other. The memory device 150 may store data for the host 120, and the controller 130 may control the storing of the data into the memory device 150. The controller 130 may also control the reading of the data from the memory device 150 and the transferring of the read data to the host.

The controller 130 and the memory device 150 may be integrated into a single semiconductor device, which may be implemented as any one of the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved.

Non-limited application examples of the memory system 110 may include a computer, an Ultra Mobile PC (UMP C), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied to the memory device. The memory device 150 may store data provided from the host 102 through a write operation, and provide data stored therein to the host 102 through a read operation. The memory device 150 may include a plurality of memory dies, each memory die including a plurality of planes, each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial) bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NEC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NEC 142 may generate a control signal for the memory device 50 and process data to be provided to the memory device 150 under the control of the processor 134. The NFC 142 may work as an interface (e.g., a NAND flash interface) for processing a command and data between the controller 130 and the memory device 150. Specifically the NFC 142 may support data transfer between the controller 130 and the memory device 150. Other type memory/storage interface may be used for a different type memory device.

The memory 144 may serve as a working memory of the memory system 110 and the controller 130 and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150, The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
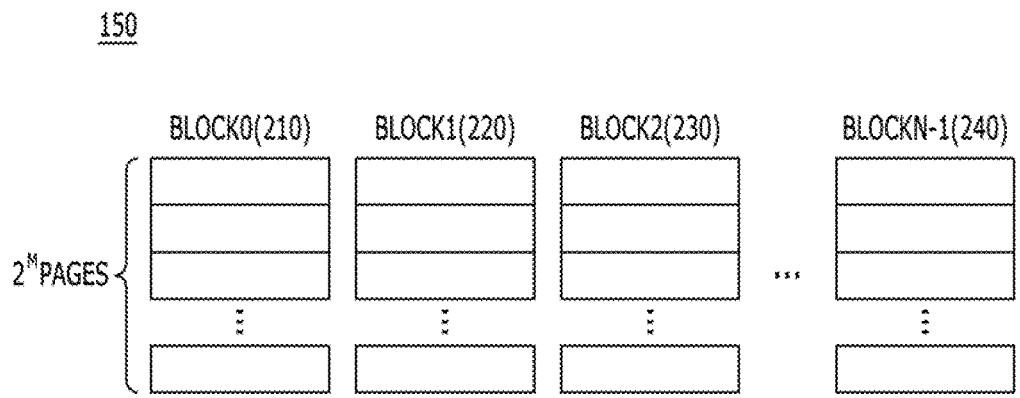
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks 0 to N−1 and each of the blocks 0 to N−1 may include a plurality of pages, for example $2^M$ pages the number of which may vary according to circuit design. Memory cells included in the respective memory blocks 0 to N−1 may be one or more of a single level cell (SLC) storing 1-bit data, or a multi-level cell (MLC) storing 2-bit or more bit data such as a triple level cell (TLC) storing 3-bit data, a quadruple level cell (QLC) storing 4-bit level cell, a multiple level cell storing 5-or-more-bit data, and so forth.

Figure 3:
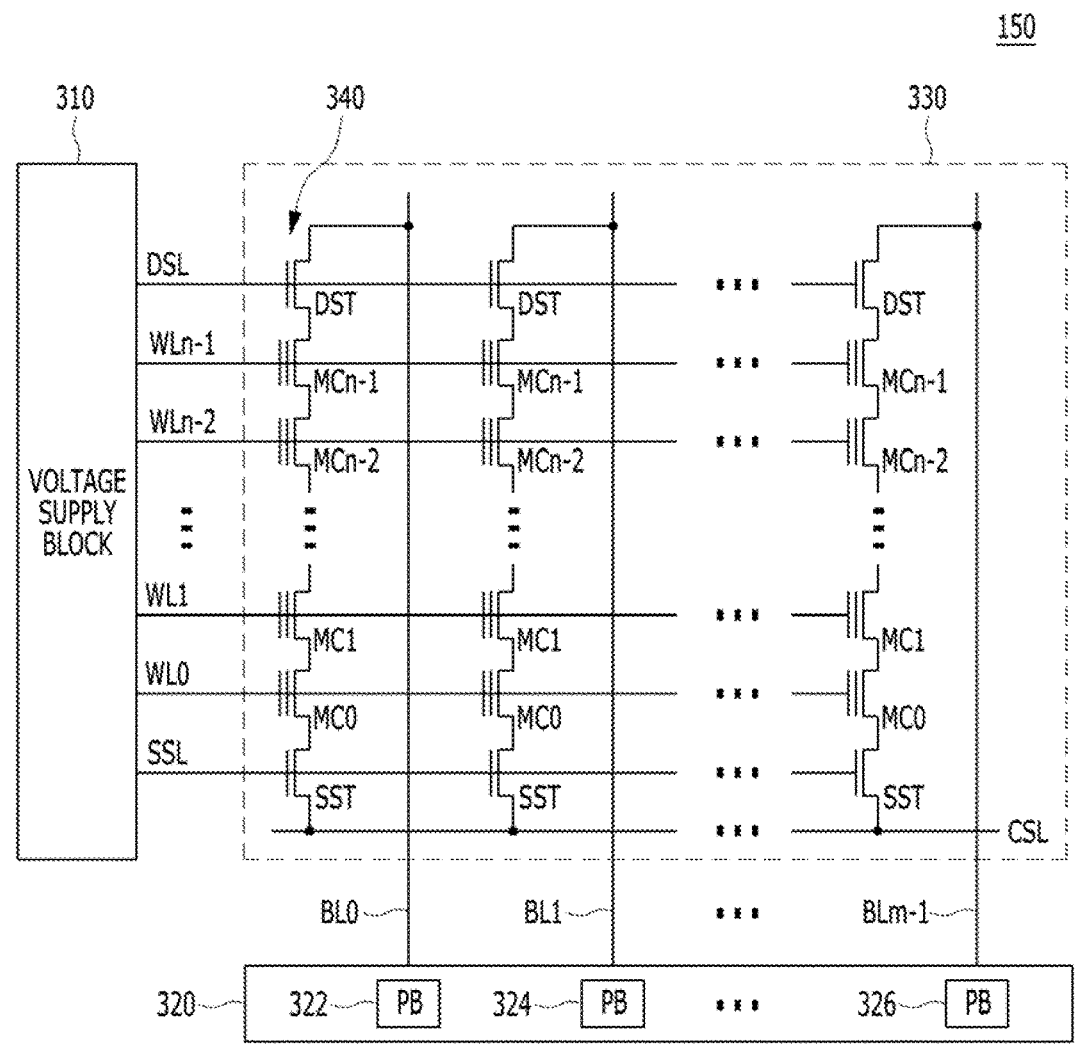
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. a memory block 330 which may correspond to any of the plurality of memory blocks 152 to 156 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3 the first cell string is coupled to the first bit line BL0, and the last cell string is coupled to the last bit line BLm−1.

Although FIG. 3 illustrates NAND flash memory cells the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated), Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
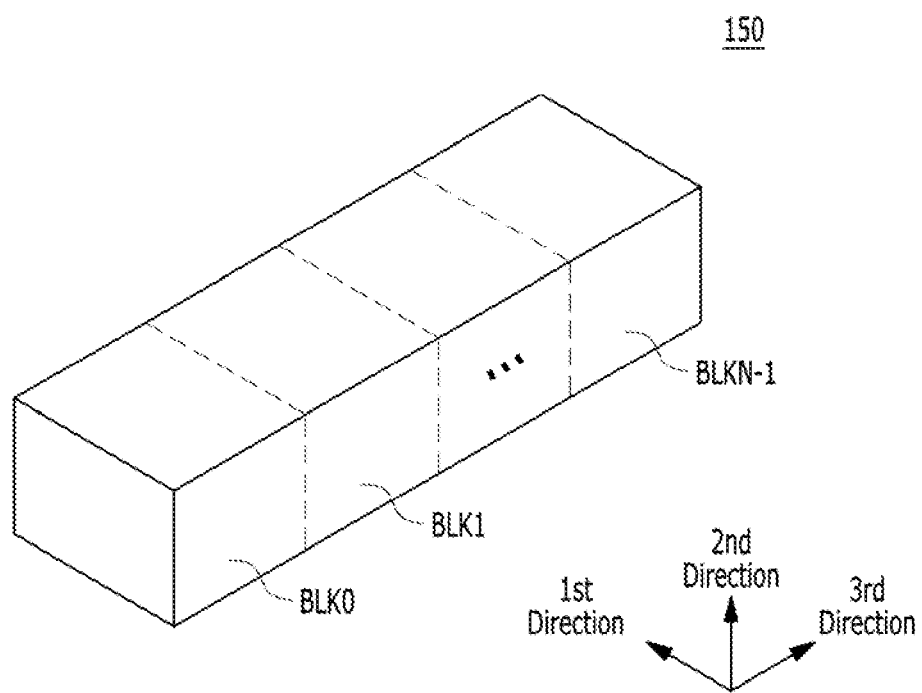
FIG. 4 is a schematic diagram illustrating an exempla three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Hereinbelow, detailed descriptions will be made with reference to FIGS. 5 to 8, for data processing with respect to the memory device 150 in a memory system in accordance with an embodiment, particularly, a data processing operation in the case of performing a command operation corresponding to a command received from the host 102.

Figure 5:
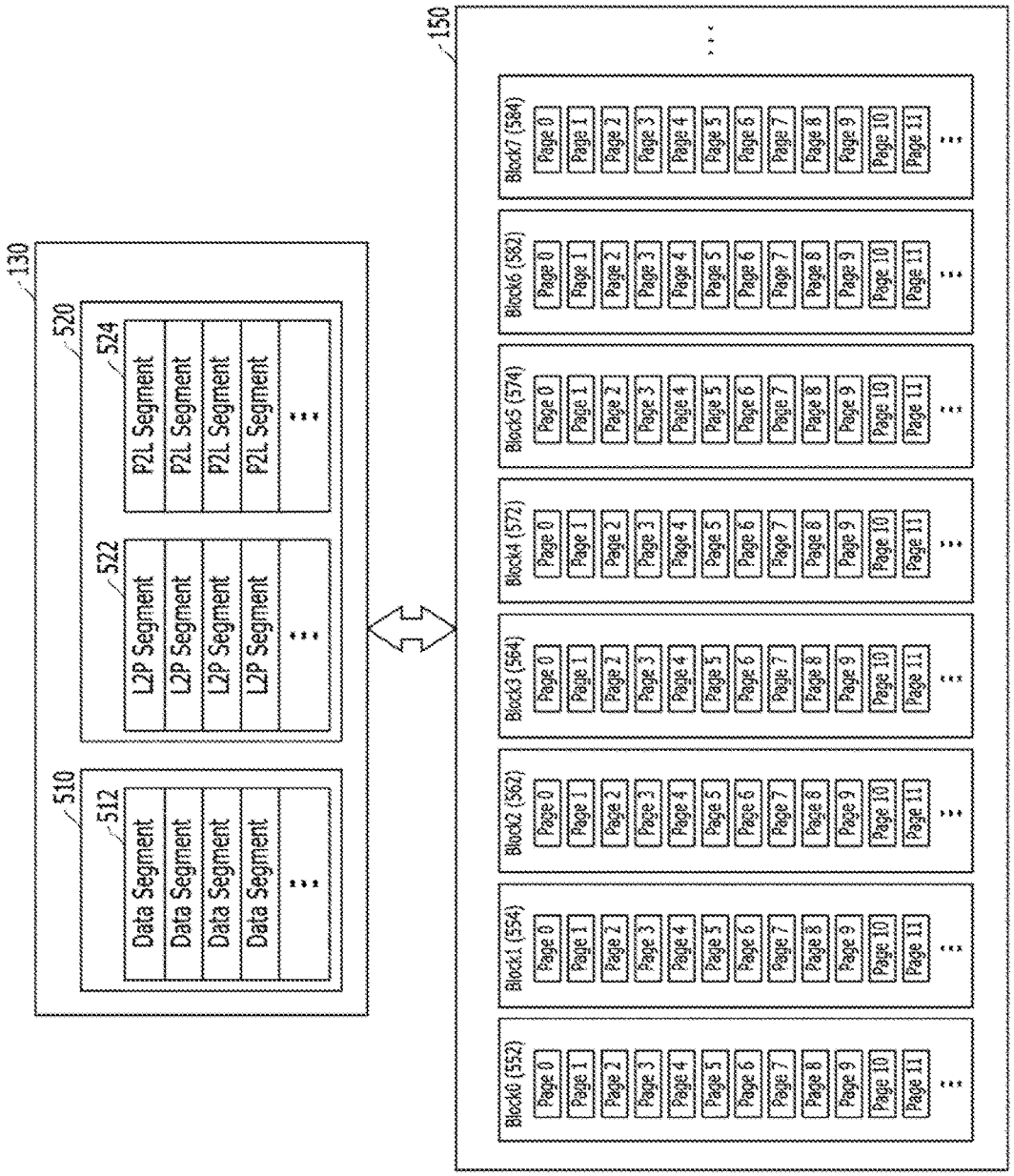
FIGS. 5 to 7 are diagrams illustrating an exemplary data processing operation to the memory system shown in FIGS. 1 to 4.
Figure 6:
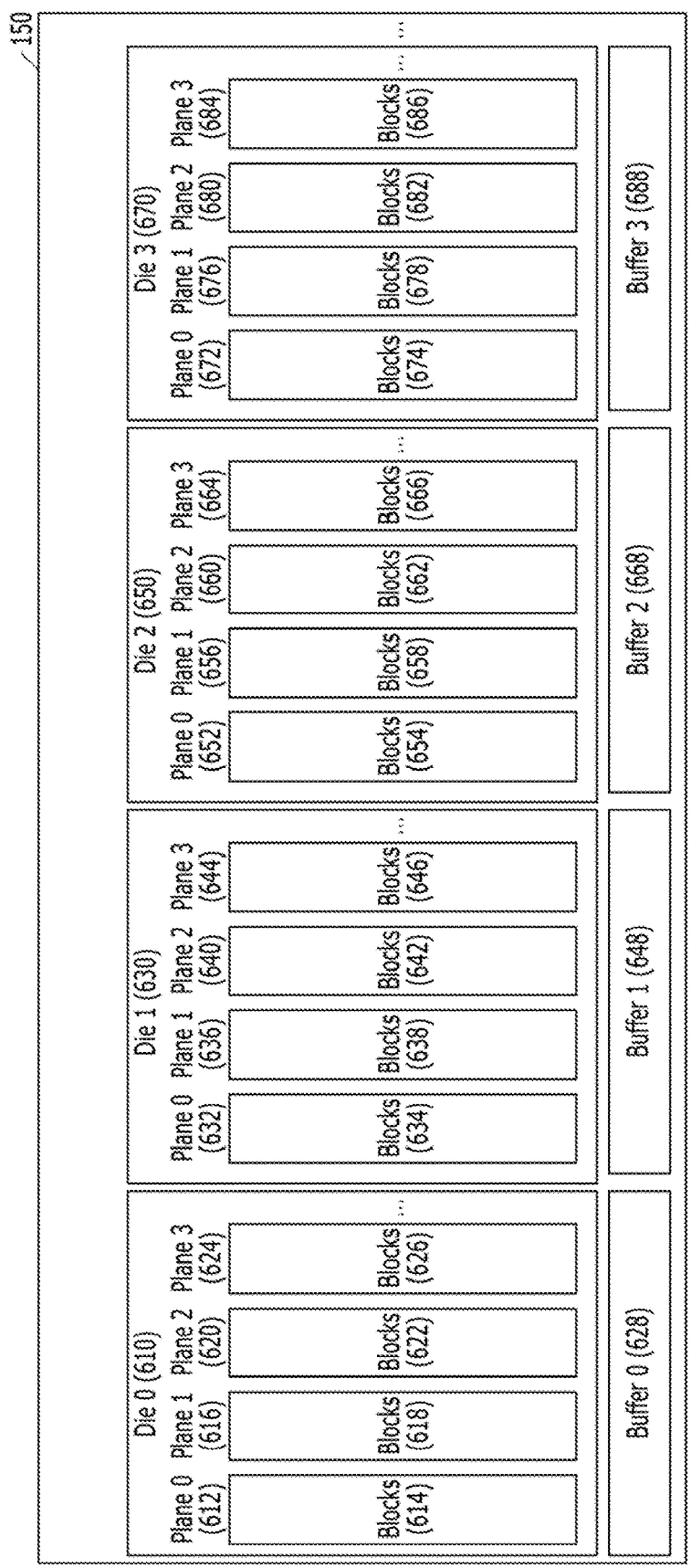
Figure 7:
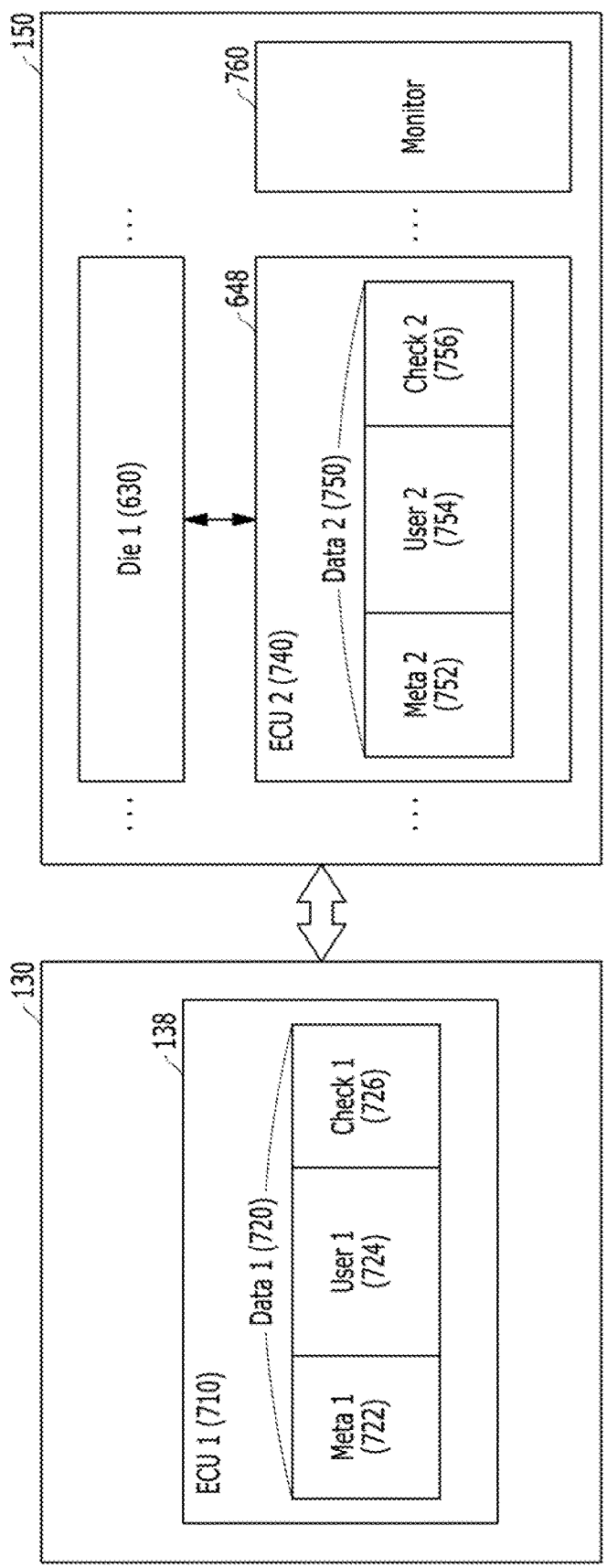

FIGS. 5 to 7 are diagrams illustrating a data processing operation to the memory system 110.

During a program operation, the controller 130 stores user data and corresponding metadata in memory blocks. The memory device 150 includes means suitable for checking an error of the user data and the metadata, for storing only the user data and metadata which do not include an error in the memory blocks of the memory device 150, and for requesting the controller 130 to retransfer the user data and metadata which include errors.

Upon storage of the error-free user data and metadata into the memory blocks of the memory device 150, the controller 130 generates and updates meta segments of the metadata, and stores the map segments in the memory blocks of the memory device 150. At this time, the controller 130 updates the map segments stored in the memory blocks of the memory device 150, by loading them in the memory 144 of the controller 130.

During a read operation, the memory device 150 checks an error of read data, and transfers to the controller 130 only the data which do not include an error. When the read data include errors, the memory device 150 reads again corresponding data from the memory device 150, checks an error of the re-read data, and transfers to the controller 130 only the re-read data which do not include an error.

When the read data is provided to the controller from the memory device 150, the controller 130 may perform another error check to detect an error of the read data, and provides to the host 102 only the read data which do not include an error. For the data which include errors, the controller 130 requests the memory device 150 to retransfer the read data or performs an error correction operation to the read data. Hence, in an embodiment, error data may be detected both at the memory device 150 and at the controller 130.

Referring to FIG. 5, in order to perform an error check for the data segments 512 stored in a first buffer 510 of the controller 130 during a program operation, the controller 130 adds check bits of the data segments 512, for instance, parity bits, cyclical redundancy check (CRC) bits or hash code bits, and transfers to the memory device 150 the data segments 512 in which the check bits are included. The memory device 150 checks an error of the data segments 512 transferred from the controller 130 using the check bits provided with the data segments 512, and programs in the memory device 150 only the data segments 512 which do not include an error.

As the error-free data segments 512 of the user data are programmed in the memory device 150, the controller 130 stores L2P segments 522 and P2L segments 524, which are meta segments of the metadata, in the second buffer 520. In the second buffer 520 of the memory 144 of the controller 130, map lists for the L2P segments 522 and the P2L segments 524.

The controller 130 stores the L2P and P2L segments 522 and 524 of the second buffer 520 in the memory device 150. For performing an error check for the map segments 522 and 524 of the second buffer 520, the controller 130 adds check bits of the map segments 522 and 524, and transfers to the memory device 150 the map segments 522 and 524 in which the check bits are included. The memory device 150 checks an error of the map segments 522 and 524 transferred from the controller 130 using the check bits provided with the map segments 522 and 524 and programs in the memory device 150 only the map segments 522 and 524 which do not include an error.

After reading out the user data from the memory device 150, the memory device 150 checks an error of the read-out user data, and transfers to the controller 130 only the user data which do not include an error. The controller 130 checks an error of the read-out user data, and provides to the host 102 only the read-out user data which do not include an error. Furthermore, in the case where errors are included in the read-out user data, the memory device 150 reads again corresponding user data. In the case where errors are included in the user data transferred from the memory device 150, the controller 130 requests the memory device 150 to retransfer the user data or performs an error correction operation to the read data.

Referring to FIG. 6, data transferred from the controller 130 during a program operation are stored in the buffers 628, 648, 668 and 688 included in the memory device 150. The memory device 150 may check for an error of the data stored in the buffers 628, 648, 668 and 688. Then, only the program data of the buffers 628, 648, 668 and 688 which do not include an error are transferred in the memory blocks 614, 618, 622, 626, 634, 638, 642, 646, 654, 658, 662, 666, 674, 678, 682 and 686 included in the respective memory dies 610, 630, 650 and 670. The memory device may request the controller 130 to retransfer the program data which include errors.

During a read operation, data are read from the corresponding memory dies 610, 630, 650 and 670, and are stored in the buffers 628, 648, 668 and 688. The memory device 150 checks an error of the read-out data of the buffers 628, 648, 668 and 688. The buffers 628, 648, 668 and 688 transfer to the controller 130 only the read data which do not include an error. The buffers 628, 648, 668 and 688 read again data from the corresponding memory dies 610, 630, 650 and 670, for the data which include errors. The controller 130 checks an error of the data transferred from the buffers 628, 648, 668 and 688, and provides to the host 102 only the data which do not include an error. When the data from the buffers 628, 648, 668 and 688 include errors, the controller 130 requests to the buffers 628, 648, 668 and 688 retransfer or performs an error correction operation to the read data.

In the embodiment of the present disclosure the error check operation in the buffers 628, 648, 668 and 688 and the error check operation in the controller 130 are performed when the memory system 110 is in an abnormal state.

An abnormal state of the memory system 110 may correspond to a case where, when performing a command operation, requirement parameters for the memory system 110, for example, operation parameters, state parameters or environment parameters of the memory system 110, such as an operation clock, a power level, a current/voltage level, an operation timing, a temperature level and so forth corresponding to performing of the command operation, are in an abnormal range. Namely, in the memory system 110 in accordance with an embodiment of the present disclosure, by monitoring the operation dock, the power level, the current/voltage level, the operation timing, the temperature level and so forth of the memory system 110, the operation parameters, the state parameters or the environment parameters of the memory system 110 are checked, that is, the requirement parameters of the memory system 110 are checked. In the case where the requirement parameters of the memory system 110 are in an abnormal range, it is determined that the memory system 110 is in an abnormal state, and the above-described error check operation is performed.

It is to be noted that error check operations may be performed not only in the case of performing a command operation to the plurality of memory dies 610, 630, 650 and 670 as described above but also in the case of performing a background operation, for example, a garbage collection operation, a wear leveling operation or a map flush operation.

Referring to FIG. 7, in the data 720 to be provided to and programmed into the memory device 150 during a program operation may include user data 724, metadata 722 for the user data 724, and check data 726 for error check of the data 720. An error check unit 710 included in the controller 130 generates the check data 726, and includes the check data 726 in the data 720. Check bits of the data 720, that is, check bits for the metadata 722 and the user data 724 are included in the check data 726. For instance, the check bits may be one or more of parity bits CRC bits, hash code bits and so forth.

The buffer 648 corresponding to the memory die 630 of the memory device 150 includes an error check unit 740 which checks an error of the data 720 transferred from the controller 130. In an embodiment, the error check unit 740 may be disposed outside the buffer 648.

In an embodiment, an error check unit is included in each of the buffers 628, 648, 668 and 688 corresponding to the memory dies 610, 630, 650 and 670. In another embodiment, the error check units may be included in an interface module which processes commands and data between the controller 130 and the memory device 150.

The interface module between the controller 130 and the memory device 150 performs a NAND flash interface operation, and is included in the memory device 150 to support processing of commands and data to be provided to and from the controller 130. Specifically, the interface module transfers commands and data between the controller 130 and the respective memory dies 610, 630, 650 and 670.

The error check units included in the interface module of the memory device 150 perform error check operations to data to be provided to and from the controller 130 for all the memory dies 610, 630, 650 and 670. After performing the error check operations to all data of the memory dies 610, 630, 650 and 670 during a program operation, the error check units of the interface module transfer error-free data to buffers of corresponding memory dies, transfer signals indicating successes of program operations to the controller 130. After performing the error check operations to all data of the memory dies 610, 630, 650 and 670 during a read operation, the error check units of the interface module transfer, to the controller 130 error-free data read from corresponding memory dies. The error check units of the interface module may request retransfer of read data in correspondence to result values of the error check operations.

The error check unit 740 of the buffer 648 performs an error check operation, for example, a mathematical operation or a logical operation, by using the data bits of the metadata 722, the data bits of the user data 724 and the check bits of the check data 726 in the data 720 transferred from the controller 130, and checks whether an error is included in the data 720 transferred from the controller 130. The error check unit 740 may perform a single operation or a combined operation among an AND operation, an OR operation, a NOT operation, an XOR operation, a NOR operation, a NAND operation and so forth as the mathematical operation or the logical operation using the data bits and check bits of the data 720, The error check unit 740 may perform an addition/subtraction operation or perform a bit-shifting operation of shifting bits to optional positions or in an optional direction.

After checking an error of the data 720 transferred from the controller 130, only in the case where an error is not included in the data 720 transferred from the controller 130, the error check unit 740 transfers the error-free data 720 to the memory die 630 so that the error-free data 720 is programmed into the memory die 630. The error check unit 740 may &so check whether the data 720 stored in the corresponding pages of the memory blocks 634, 638, 642 and 646 have been programmed normally. In other words, the error check unit 740 checks whether an error has occurred when transferring the data 720 from the buffer 648 to the corresponding pages of the memory blocks 634, 638, 642 and 646 and whether the data 720 have been stored normally in the corresponding pages of the memory blocks 634, 638, 642 and 646. In order to check whether the data 720 stored in the corresponding pages have been programmed normally the error check unit 740 reads the data 720 stored in the corresponding pages and performs an error check operation by using the data bits and check bits of the read data.

In the case where an error is not included in the data 720 stored in the corresponding pages, that is, in the case where the data 720 transferred from the controller 130 have been programmed and stored normally, the error check unit 740 transfers to the controller 130 a signal indicating a success of the program operation. In the case where an error is included in the data 720 stored in the corresponding pages, that is, in the case where the data 720 transferred from the controller 130 have not been programmed and stored normally, the error check unit 740 reprograms the data 720 transferred from the controller 130, in pages of the memory blocks 634, 638, 642 and 646.

In the case where an error is included in the data 720 transferred from the controller 130, the error check unit 740 requests the controller 130 to retransfer the data 720 in which the error is included, and the controller 130 retransfers the data 720 to the memory device 150 in response to the retransfer request.

Referring to FIG. 7, the data 750 read from the memory die 630 may include user data 754, metadata 752 for the user data 754, and check data 756 for checking an error of the data 750. The user data 754, the metadata 752 and the check data 756 at the read operation may be the same as the user data 724 the metadata 722 and the check data 726 at the program operation, respectively, when no error occurs in the data.

The read-out data 750 are stored in the buffer 648 and the error check unit 740 checks an error of the read-out data 750. The error check unit 740 checks an error of the read-out data 750 by performing an error check operation in a similar way as performed during the program operation.

After checking an error of the read-out data 750, only in the case where an error is not included in the read data 750, the error check unit 740 transfers the error-free data 750 to the controller 130.

The error check unit 710 included in the ECC unit 138 of the controller 130 checks an error of the data 750 transferred from the memory device 150. Namely the error check unit 710 checks whether an error has occurred in the data 750 transferred from the memory device 150. This error check operation may be performed in a similar way as performed during the program operation.

After checking an error of the data 750 transferred from the memory device 150, only in the case where an error is not included in the data 750 transferred from the memory device 150, the error check unit 710 provides the error-free data 750 to the host 102. In the case where an error is included in the data 750 transferred from the memory device 150, the error check unit 710 requests the memory device 150 to retransfer the data 750 in which the error is included, and the memory device 150 retransfers the data 750 to the controller 130 in correspondence to the retransfer request. In the case where an error is included in the data 750 transferred from the memory device 150, the error check unit 710 may perform an error correction operation to the transferred data.

Furthermore, the memory device 150 includes a monitor 760 for checking an abnormal state of the memory system 110.

The monitor 760 may monitor at least one of operation clocks, power levels, current/voltage levels, operation timings, temperature levels and so forth in the controller 130 and the memory device 150 in correspondence to the performing of a command operation while the controller 130 and the memory device 150 perform the command operation. In other words, the monitor 760 monitors the requirement parameters for the controller 130 and the memory device 150 in correspondence to the performing of a command operation, for example, operation parameters, state parameters or environment parameters of the controller 130 and the memory device 150. The monitor 760 checks whether the requirement parameters for the controller 130 and the memory device 150 are in an abnormal range. In the case where the requirement parameters are in an abnormal range, the monitor 760 transfers a trigger signal for error check operations to the controller 130 and the memory device 150 such that the controller 130 and the memory device 150 perform the error check operations as described above. For example, the monitor 760 monitors at least one of operation clocks, power levels, current/voltage levels, operation timings, temperature levels and so forth in the controller 130 and the memory device 150 when performing a command operation in the controller 130 and the memory device 150, checks that: the monitored operation clocks, the power levels, the current/voltage levels, the operation timings, the temperature levels and so forth exist in an abnormal range and thus the controller 130 and the memory device 150 perform the command operation in an abnormal state, and if the monitored parameter is in an abnormal stage, then transfers a trigger signal for performing error check operations in the controller 130 and the memory device 150, to the controller 130 and the memory device 150.

As a consequence, in the case where the controller 130 and the memory device 150 are in an abnormal state, error check operations are performed to data processed in the controller 130 and the memory device 150, whereby the reliability of data processing and operation in the memory system 110 may be improved and the operational performance of the memory system 110 may be improved.

Further, in the memory system 110 in accordance with the embodiment of the present disclosure, not only the controller 130 performs an error check operation, but also the memory device 150 performs an error check operation. For example, by performing error check operations to data transferred from the controller 130 and data stored in the memory device 150, processing of data including an error may be minimized and the operational performance of the memory system 110 may be further improved.

In particular, in the memory system 110 in accordance with the embodiment of the present disclosure, by checking an error which is likely to occur when transferring data between the controller 130 and the memory device 150, in the controller 130 and the memory device 150, a data transfer error between the controller 130 and the memory device 150 may be minimized, and the operational performance of the memory system 110 may be further improved.

Figure 8:
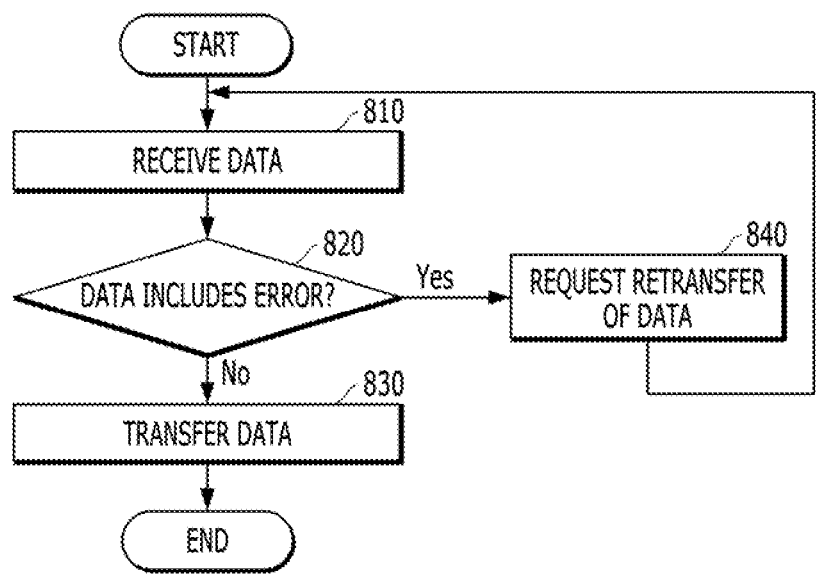
FIG. 8 is a flow chart illustrating an operation of the memory system shown in FIGS. 5 to 7.

FIG. 8 is a flow chart illustrating an operation process for processing data in the memory system 110.

Referring to FIG. 8, at step 810, the memory system 110 receives data from the host 102, The memory device 150 of the memory system 110 receives data from the controller 130 during a program operation, During a read operation, the controller 130 of the memory system 110 receives data read out from the memory device 150, and the read-out data are transferred to the controller 130 after an error check operation is performed in the memory device 150.

At step 820, by performing error check operations to the data transferred from the controller 130 during the program operation and the memory device 150 during the read operation, whether an error is included in the data is determined. The memory device 150 performs an error check operation to the data transferred from the controller 130 and thereby checks whether the data are data which include an error during the program operation, and the controller 130 performs an error check operation to the data transferred from the memory device 150 and thereby checks whether the data are data which include an error during the read operation. In particular, in an abnormal state of the controller 130 and the memory device 150, in the case where data are transferred between the controller 130 and the memory device 150, an error check operation is performed for the data.

In the case where an error is included in the data transferred from the controller 130, at step 840, retransfer of the data which include the error s requested to the controller 130 during the program operation. In the case where an error is not included in the data transferred from the controller 130, at step 830, the data which do not include an error are transferred to the memory dies, and are programmed in the memory device 150 during the program operation. During the read operation, the memory device 150 checks an error of the data programmed in the corresponding pages of the memory blocks in the memory dies. In the case where an error is not included in the programmed data, the memory device 150 transfers a program success signal to the controller 130. In the case where an error is included in the programmed data, the memory device 150 programs again the data in pages of memory blocks in the memory dies.

In the case where an error is not included in the data transferred from the memory device 150, at step 830, the controller 130 transfers to the host 102 the data which do not include an error during the read operation. In the case where an error is included in the data transferred from the memory device 150 during the read operation, at step 840, the controller 130 requests to the memory device 150 retransfer of the data which include the error. In the case where an error is included in the data transferred from the memory device 150 during the read operation, the controller 130 may perform an error correction operation to the transferred data. In the case where an error is not included in the data during the read operation, the controller 130 provides data, to the host 102.

Since detailed descriptions were made above with reference to FIGS. 5 to 7 for the data processing operations of the controller 130 and the memory device 150, further descriptions thereof will be omitted herein.

FIGS. 9 to 17 are diagrams schematically illustrating application examples of the data processing system of FIG. 1.

Figure 9:
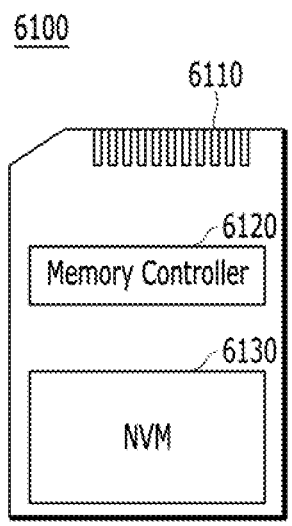
FIGS. 9 to 17 are diagrams schematically illustrating application examples of the data processing system shown in FIG. 1, in accordance with various embodiments of the present invention.

FIG. 9 is a diagram schematically illustrating another example of the data processing system 100. FIG. 9 schematically illustrates a memory card system to which the memory system in accordance with the present embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC) peripheral component interconnection (PCI), PCI express (PCIe), Advanced Technology Attachment (ATA), Serial-ATA, Parallel-ATA, small computer system interface (SCSI), enhanced small disk interface (EDSI) Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable RON (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be Integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
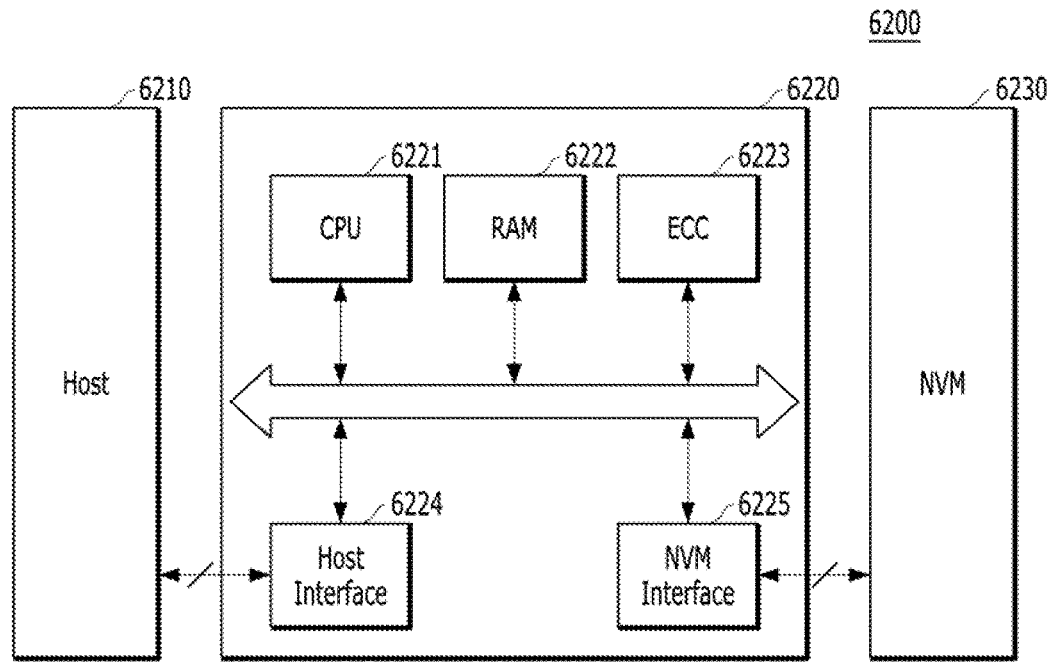

FIG. 10 is a diagram schematically illustrating another example of the data processing system including the memory system in accordance with an embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230, The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LIE). The memory controller 6220 may be connected to an external device, for example, the host 6210 or another external device and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
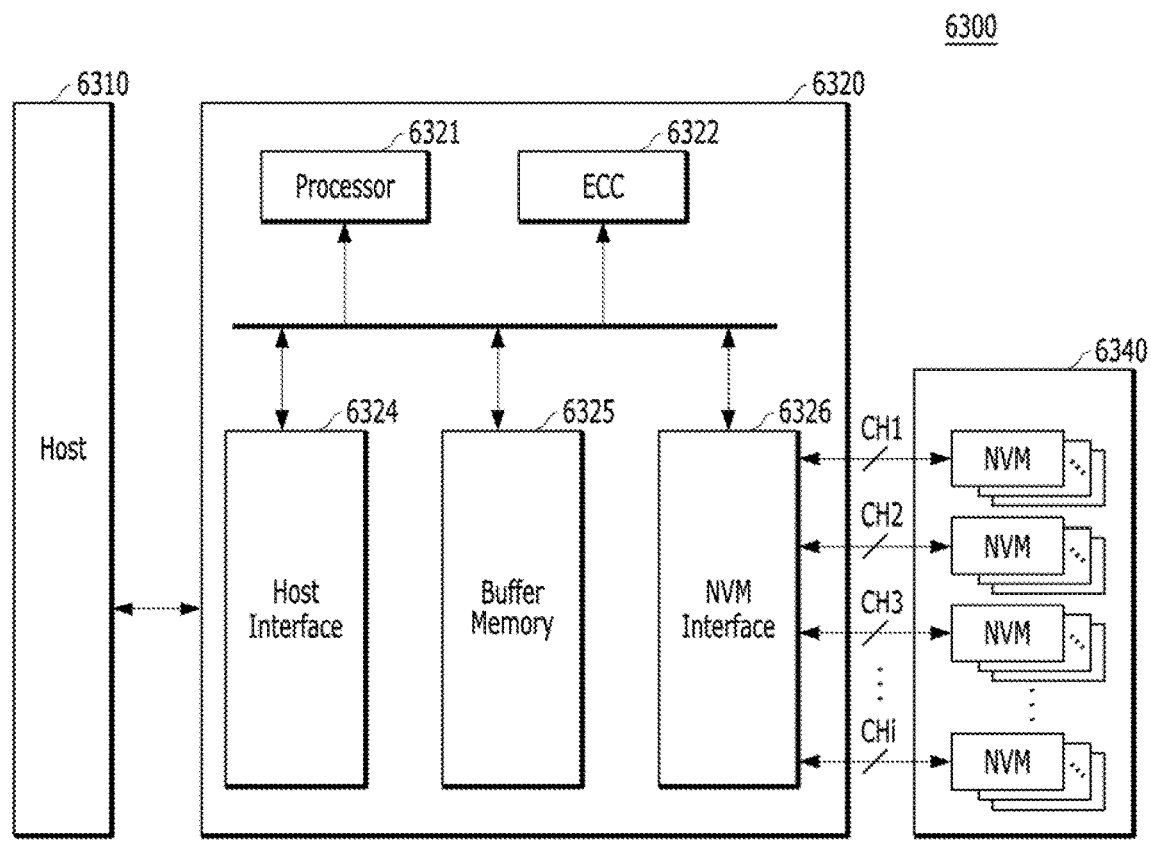
Figure 12:
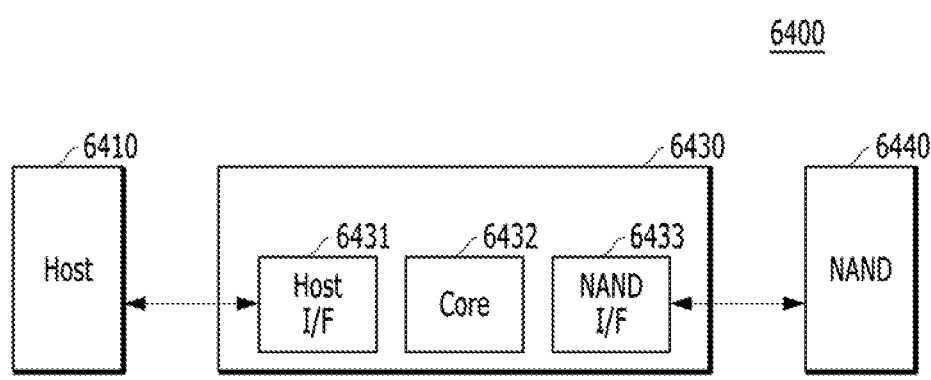

FIG. 11 is a diagram schematically illustrating another example of the data processing system including the memory system in accordance with an embodiment. FIG. 12 schematically illustrates an SSD including the memory system 110.

Referring to FIG. 11, the SSD 6300 may include a controller 6320 and a memory device 6340 including a plurality of nonvolatile memories. The controller 6320 may correspond to the controller 130 in the memory system 110 of FIGS. 1 and 5, and the memory device 6340 may correspond to the memory device 150 in the memory system 110 of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 10 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
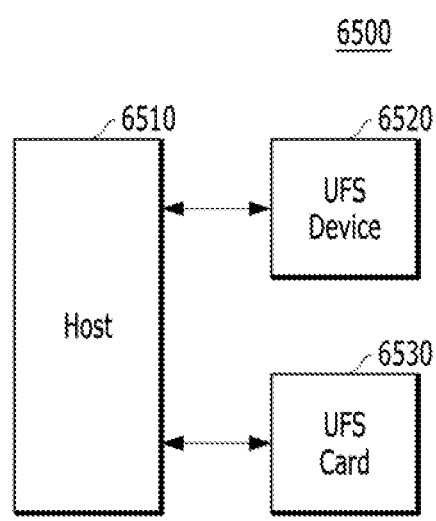

FIG. 12 is a diagram schematically illustrating another example of the data processing system including the memory system in accordance with an embodiment. FIG. 13 schematically illustrates an embedded Multi-Media Card (eMMC) including the memory system 110.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 and 5, and the memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with various embodiments, Specifically, FIGS. 14 to 17 schematically illustrate Universal Flash Storage (UFS) systems including the memory system 110.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800 the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI Unified Protocol (UniPro) in Mobile Industry Processor Interface (MIPI). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the) form of a star to the host 6410, and a plurality of UFS cards may be connected in parallel or in the form of a star to the UFS device 6520 or connected in series or in the form of a chain to the UFS device 6520.

Figure 14:
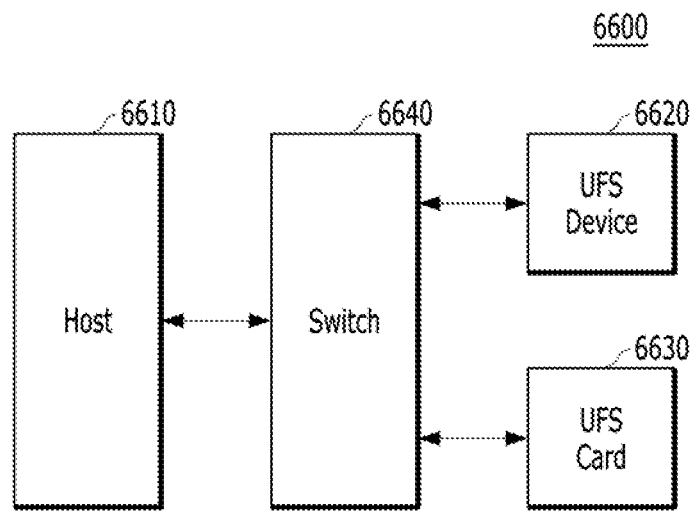

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
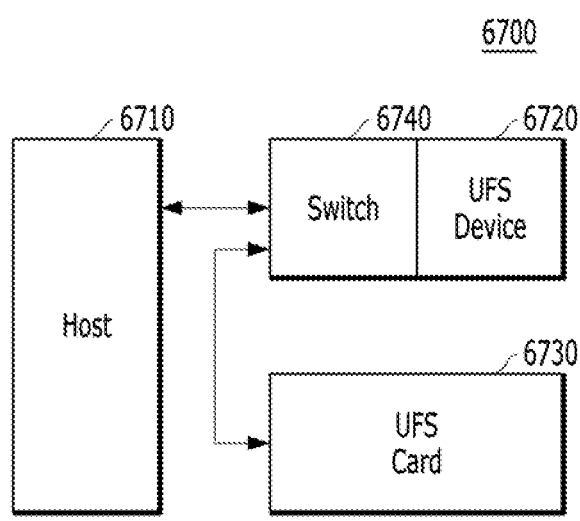

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
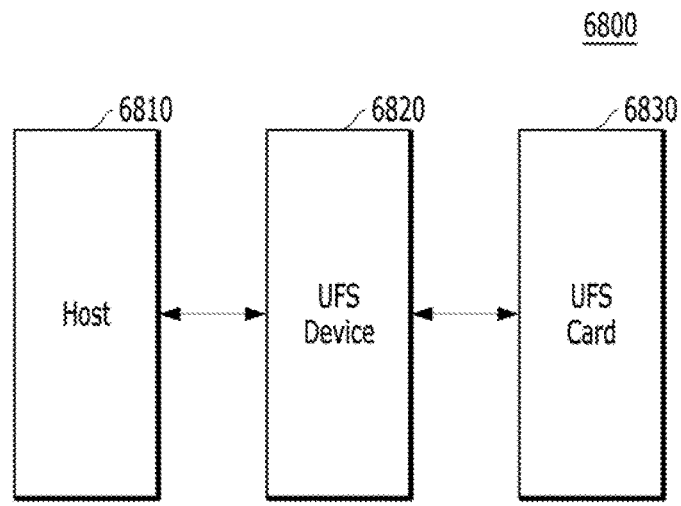

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
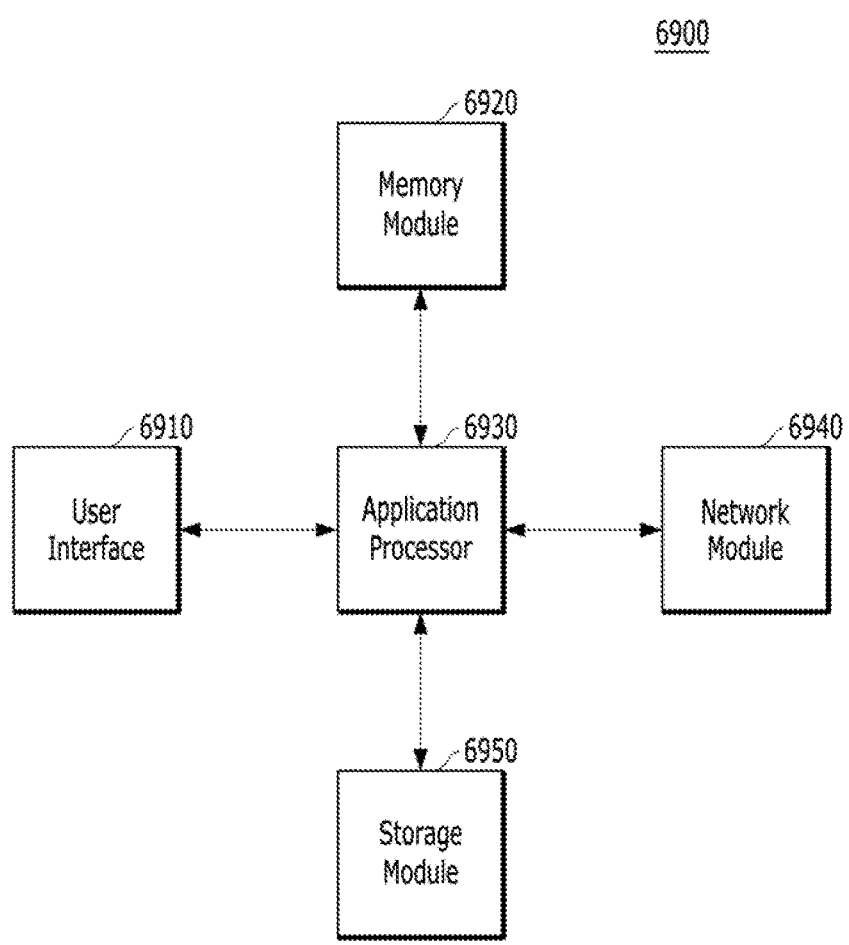

FIG. 17 is a diagram schematically illustrating another example of the data processing system including a memory system in accordance with an embodiment. FIG. 18 is a diagram schematically illustrating a user system including the memory system 110.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers interfaces and a graphic engine which control the components included in the user system 6900. The application processor 6930 may be provided as System-on-Chip (SoC).)

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930, The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

The memory system and the operating method thereof according to the embodiments may reduce performance deterioration of the memory system, and maximize use efficiency of a memory device.

Although the present invention has been described in reference to various specific embodiments for illustrative purposes, it will be apparent to those skilled in the art to which the present invention pertains that various other embodiments, changes and modifications thereof, may be made without departing from the spirit and scope of the invention as defined in the following claims.

What is claimed is:

1. A memory system comprising:
   a memory device including a plurality of memory blocks; and
   a controller suitable for performing a command operation to the memory device,
   wherein the memory device and the controller individually perform an error check operation on inputted/outputted data, and whether the inputted/outputted data includes an error is checked twice for a read operation or write operation.

2. The memory system according to claim 1, wherein the memory device is suitable for performing the error check operation to a first data provided from the controller to store the first data the memory device, and requesting the controller to retransfer the first data without storage of the first data when an error is included in the first data.

3. The memory system according to claim 2, wherein, when an error is not included in the first data, the memory device stores the first data in the memory blocks, and transfers to the controller a signal indicating a success of a program operation to the first data.

4. The memory system according to claim 3, wherein, after reading the first data stored in the memory blocks, the memory device performs the error check operation for the read first data, and when the read first data include an error, the memory device stores again the first data which do not include an error, in the memory blocks.

5. The memory system according to claim 1, wherein the memory device performs the error check operation to a second data read from the memory blocks, and transfers to the controller the second data which do not include an error.

6. The memory system according to claim 5, wherein the memory device reads again the second data from the memory blocks when an error is included in the second data.

7. The memory system according to claim 5, wherein the controller performs the error check operation to the second data provided from the memory device, provides to an outside the second data which do not include an error, and requests to the memory device retransfer of the second data when the second data include an error.

8. The memory system according to claim 1,
   further comprising a monitor suitable for checking an abnormal state of one or more of the controller and the memory device,
   wherein the monitor transfers to the controller and the memory device a trigger signal, which triggers the error check operations, when one or more of the controller and the memory device are in the abnormal state.

9. The memory system according to claim 8, wherein the abnormal state is determined when requirement parameters including operation clocks, power levels, current/voltage levels, operation timings and temperature levels for the controller and the memory device exist in an abnormal range.

10. The memory system according to claim 1,
    wherein the memory device includes a plurality of memory dies each having the plurality of memory blocks,
    wherein the memory device includes buffers corresponding to the memory dies, respectively, and
    wherein the buffers respectively include error check units which perform the error check operation for data to be stored in the memory dies.

11. The memory system according to claim 10, wherein the error check operation includes a mathematical operation or a logical operation using data bits and check bits of the inputted/outputted data.

12. The memory system according to claim 11,
wherein the memory device further includes an interface module suitable for transferring the inputted/outputted data between the controller and the respective memory dies, and
wherein the interface module includes error check units suitable for performing the error check operations to the inputted/outputted data, and transferring the inputted/outputted data to corresponding memory dies among the memory dies.

13. A method for operating a memory system including a controller and a memory device including a plurality of memory blocks, the method comprising:
performing, individually by the memory device and the controller, an error check operation on inputted/outputted data,
wherein, whether the inputted/outputted data includes an error is checked twice for a read operation or write operation.

14. The method according to claim 13, further comprising:
providing, from the controller to the memory device, a first data;
performing, by the memory device, the error check operation to the first data to store the first data therein; and
requesting, by the memory device to the controller, retransfer of the first data without storage of the first data when an error is included in the first data.

15. The method according to claim 14, further comprising when an error is not included in the first data:
storing, by the memory device, the first data in the memory blocks; and
transferring, by the memory device to the controller, a signal indicating a success of a program operation to the first data.

16. The method according to claim 13, further comprising:
performing, by the memory device, the error check operation to a second data read from the memory blocks; and
transferring, by the memory device to the controller, the second data which do not include an error.

17. The method according to claim 16, further comprising reading again, by the memory device, the second data from the memory blocks when an error is included in the second data.

18. The method according to claim 16, further comprising:
performing, by the controller, the error check operation to the second data provided from the memory device;
providing, by the controller to an outside, the second data which do not include an error; and
requesting, by the controller to the memory device, retransfer of the second data when the second data include an error.

19. The method according to claim 13, further comprising:
checking, by a monitor, an abnormal state of one or more of the controller and the memory device; and
transferring, by the monitor to the controller and the memory device, a trigger signal, which triggers the error check operations, when one or more of the controller and the memory device are in the abnormal state.

20. The method according to claim 19, wherein the abnormal state is determined when requirement parameters including operation clocks, power levels, current/voltage levels, operation timings and temperature levels for the controller and the memory device exist in an abnormal range.

21. The method according to claim 13, wherein the error check operation includes a mathematical operation or a logical operation using data bits and check bits of the inputted/outputted data.

22. A memory system comprising:
a memory device including a plurality of memory blocks; and
a controller suitable for performing a command operation to the memory device,
wherein the memory device and the controller individually perform an error check operation on inputted/outputted data, and whether the inputted/outputted data includes an error is checked twice for a read operation or write operation.

23. The memory system according to claim 22, wherein the memory device is suitable for performing the error check operation to a first data provided from the controller to store the first data the memory device, and requesting the controller to retransfer the first data without storage of the first data when an error is included in the first data.

24. The memory system according to claim 23, wherein, when an error is not included in the first data, the memory device stores the first data in the memory blocks; and transfers to the controller a signal indicating a success of a program operation to the first data.

25. The memory system according to claim 22, wherein the memory device performs the error check operation to a second data read from the memory blocks, and transfers to the controller the second data which do not include an error.

26. The memory system according to claim 22,
further comprising a monitor suitable for checking an abnormal state of one or more of the controller and the memory device,
wherein the monitor transfers to the controller and the memory device a trigger signal, which triggers the error check operations, when one or more of the controller and the memory device are in the abnormal state.

27. The memory system according to claim 22,
wherein the memory device includes a plurality of memory dies each having the plurality of memory blocks,
wherein the memory device includes buffers corresponding to the memory dies, respectively, and
wherein the buffers respectively include error check units which perform the error check operation for data to be stored in the memory dies.

28. The memory system according to claim 27, wherein the error check operation includes a mathematical operation or a logical operation using data bits and check bits of the inputted/outputted data.

29. The memory system according to claim 24, wherein, after reading the first data stored in the memory blocks, the memory device performs the error check operation for the read first data, and when the read first data include an error, the memory device stores again the first data which do not include an error, in the memory blocks.

30. The memory system according to claim 25, wherein the memory device reads again the second data from the memory blocks when an error is included in the second data.

31. The memory system according to claim 25, wherein the controller performs the error check operation to the second data provided from the memory device, provides to an outside the second data which do not include an error, and requests to the memory device retransfer of the second data when the second data include an error.

32. The memory system according to claim 26, wherein the abnormal state is determined when requirement parameters including operation clocks, power levels, current/voltage levels, operation timings and temperature levels for the controller and the memory device exist in an abnormal range.

33. The memory system according to claim 28,
wherein the memory device further includes an interface module suitable for transferring the inputted/outputted data between the controller and the respective memory dies, and
wherein the interface module includes error check units suitable for performing the error check operations to the inputted/outputted data, and transferring the inputted/outputted data to corresponding memory dies among the memory dies.

* * * * *